July 2, 1957   E. L. CONNELL   2,797,782
POWER TRANSMISSION
Filed June 2, 1954   3 Sheets-Sheet 1
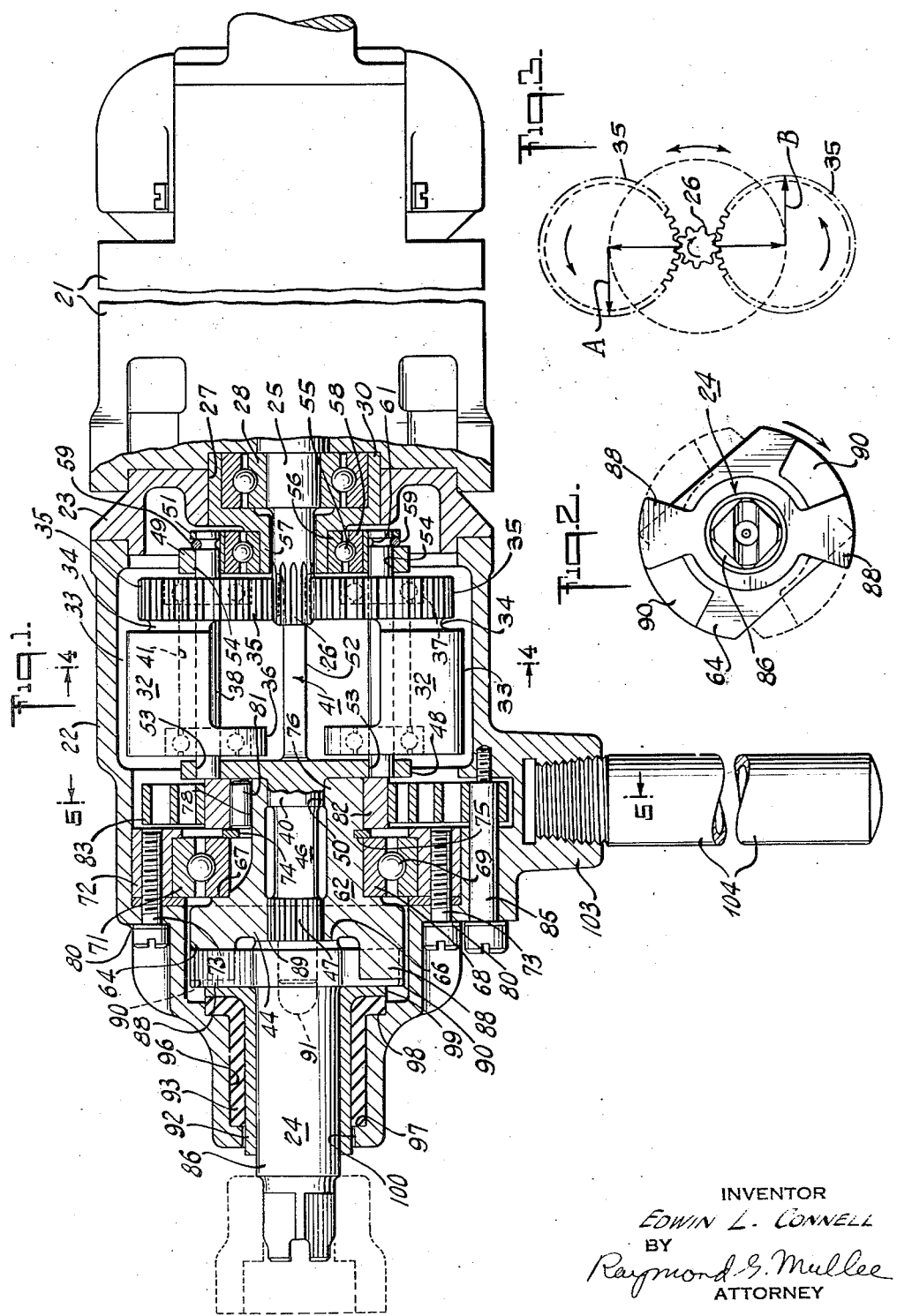
INVENTOR
EDWIN L. CONNELL
BY
Raymond G. Mullee
ATTORNEY

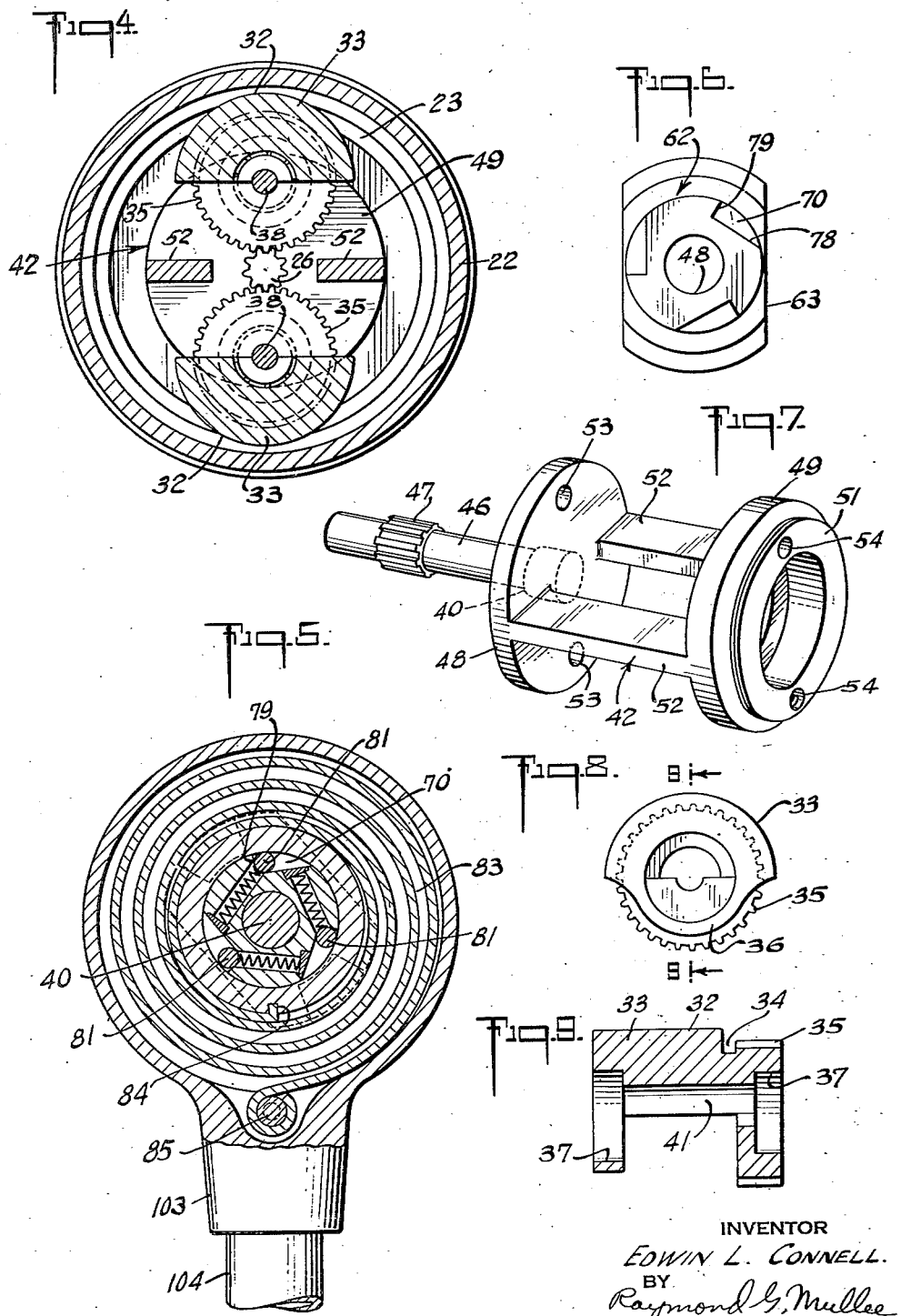

July 2, 1957 E. L. CONNELL 2,797,782
POWER TRANSMISSION
Filed June 2, 1954 3 Sheets-Sheet 3
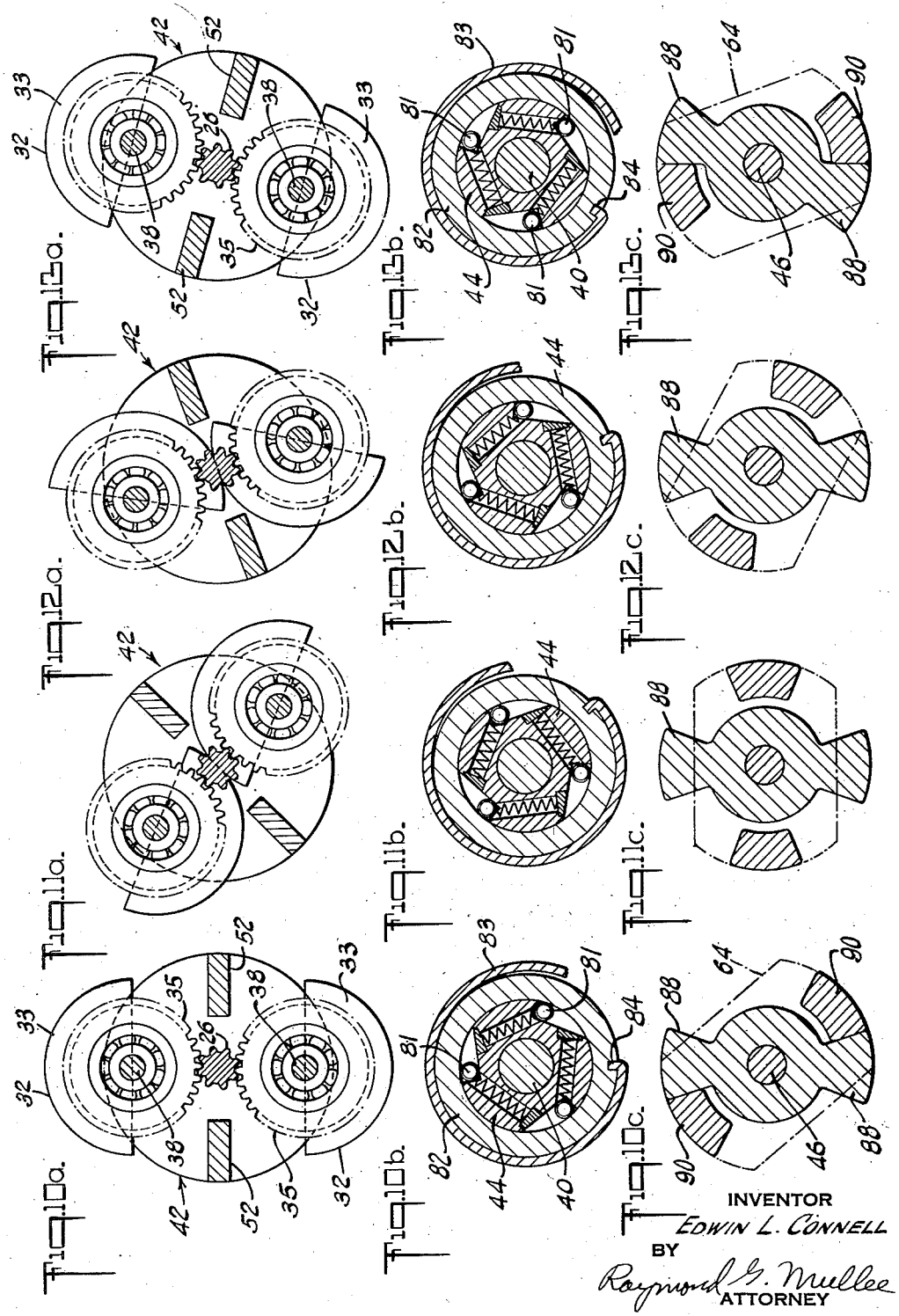
INVENTOR
EDWIN L. CONNELL
BY
Raymond G. Mueller
ATTORNEY

United States Patent Office 2,797,782
Patented July 2, 1957

2,797,782
POWER TRANSMISSION

Edwin L. Connell, Utica, N. Y., assignor to Chicago Pneumatic Tool Company, New York, N. Y., a corporation of New Jersey Application June 2, 1954, Serial No. 433,964

15 Claims. (Cl. 192—30.5)

This invention relates to a mechanism for converting continuous torque into pulsating torque. The invention is particularly adaptable to impacting mechanisms, such as impact wrenches in which the constant torque of a driving means is converted into intermittent torsional impacts such as would be useful in the driving or loosening of nuts, bolts, etc., and it is in this connection that the invention will be described.

In accordance with the invention, power from the driving shaft of a motor, is transmitted by a system including a pair of eccentrically balanced planetary gears mounted in a carrier member which is caused to oscillate by action of the gears and thus impart intermittent rotary motion to a clutch means and a spindle or toolhead, the latter being connected to a wrench or tool, to drive the latter. A spring associated with the clutch means receives energy from the carrier member as it oscillates in one direction, and releases the accumulated energy when the carrier member is caused to oscillate in the opposite direction, the net result being that a torsional impulse is delivered to the wrench or tool in excess of the constant torque of the motor.

An object of the invention is to provide a mechanism for the conversion of constant torque to an intermittent torque of relatively high intensity.

Another object of the invention is to provide a mechanism which utilizes the effect of unbalanced rotative forces to develop forces of impact.

A further object is to provide a mechanism of the character indicated in which a spring intermittently stores energy which upon release contributes to the effect of the forces of unbalance.

These and further objects and features of the invention will appear more clearly from the following description when considered in connection with the accompanying drawings wherein:

Fig. 1 is a side elevation, partly in longitudinal section, of a power transmission device embodying the invention;

Fig. 2 is an end view of a clutch shaft and tool head of Fig. 1 as seen from the left therein;

Fig. 3 is a diagram of forces showing the relative movements of the rotor shaft and the unbalanced planetary gears during operation, looking forwardly;

Fig. 4 is a transverse section taken on line 4—4 in Fig. 1 looking rearwardly;

Fig. 5 is another transverse section taken on line 5—5 in Fig. 1 looking forwardly;

Fig. 6 is an end view of the clutch shaft of Fig. 2;

Fig. 7 is a perspective view of the carrier for the planetary gears of Figs. 1 and 4;

Fig. 8 is an end view of one of the mentioned planetary gears, viewed from the front;

Fig. 9 is a longitudinal section of the planetary gear taken on line 9—9 in Fig. 8;

Figs. 10a to 13a are end views, looking forwardly as indicated by the arrows 10a in Fig. 1, of the planetary gears and carrier in various operative positions, Fig. 10a being at the beginning of oscillation or with centrifugal forces in balance, Fig. 11a being at the completion of the oscillation to wind the spring which is the maximum deflection of the carrier to the left, Fig. 12a being shortly prior to impact at the point where the carrier starts rotating faster than the cluch ring, and Fig. 13a being the position upon completion of delivery of impact and showing the tool head advanced by the impact;

Figs. 10b to 13b are transverse views of the overrunning clutch and a section of the spring in positions corresponding to the positions of the gears shown in Figs. 10a to 13a respectively, the views being taken as indicated by the arrows 5 in Fig. 1; and Figs. 10c to 13c are cross sectional views, as indicated by the arrows 10c in Fig. 1, showing the hammer dogs of the clutch shaft in relation to the tool head in positions corresponding to the positions of the gears shown in Figs. 10a to 13a respectively.

Returning now to Fig. 1 it is seen that a drive motor in a housing 21 is spaced from a transmission housing 22 by a transfer plate 23, all three units being bolted together by conventional means not shown. The transmission housing 22 supports a spindle or tool head 24 at the front end, and encloses a transmission system, as will be described. Projecting from the motor is a driving shaft 25, the end portion of which is of reduced diameter and includes a geared periphery 26 adapted to function as a pinion. The shaft 25 extends in spaced relation through a bushing 30 which is mounted in a centrally positioned aperture 27 in transfer plate 23. A ball bearing 28 supports the shaft, while transfer plate 23 serves in part as a rear closure for the housing 22, all as shown in Fig. 1.

Twin planetary eccentrically weighted members 32 are actuated in rotation by the drive shaft 25. Each planetary member comprises, an eccentrically weighted body portion 33 integrally connected by a neck 34 to a rear geared portion 35, a bearing retaining portion 36 at the forward end, recesses 37 in the end faces, and a longitudinal half bore 41 to lighten the inner portion of the body member (Figs. 8 and 9). Each planetary member 32 is rotatably mounted upon a shaft 38 by conventional ball bearings 39 arranged within the recesses 37. Each planetary shaft 38 is rigidly mounted 180° apart on a carrier member 41.

The planetary carrier 42 is made as a unit and comprises a shaft 46, a portion of enlarged diameter 47 provided with splines and formed upon the forward portion of the shaft, a flange 48, a portion of enlarged diameter 40, an end ring 49 formed with an annular projection 51 upon its rear face, and webs 52 joining the flange 48 and the end ring 49. The flange is provided with diametrically opposed bored apertures 53, and the end ring 49 and its annular projection 51 are similarly provided with bored apertures 54 in longitudinal registration with the apertures 53.

The forward ends of the shafts 38 are fitted to the apertures 53 in the carrier flange, and the rear ends are fitted into the apertures 54 of the end ring, a snap ring 59 mounted in the groove 61 preventing axial displacement of the shafts. The twin planetaries, when actuated about the shafts 38 by the drive shaft 25, serve as a force-couple to impart oscillatory motion to the carrier 42, as hereinafter more fully explained.

The planetary carrier 42 is rotatably mounted within the clutch housing. The end ring 49 of the carrier is maintained in spaced and rotatable relation to the transfer plate by conventional ball bearings 55, the races of which are formed in the stationary ring 56 secured to the tubular forward projection 57 of the bushing 30 and the rotatable ring 58 secured to the end ring. Forwardly, the splined portion of increased diameter 47 is rigidly secured in a driving fit to the clutch shaft 44 and the portion of increased diameter 40 is fitted into the aperture 50 formed in the rear end of the clutch shaft. The extreme forward end of the carrier is journaled into the cylindrical recess 91 in the rear portion of the tool head 24. It is thus seen that the carier is rotatable with reference to the entire assembly excepting the clutch shaft 44, and that it rotates with the clutch shaft as a unit, being limited in its rotation by the limitations of the clutch shaft. It is here pointed out that the webs 52 serve merely as connecting members between the carrier flange 48 and the end ring 49 and at no time during operation of the apparatus contact any other member thereof.

The clutch shaft 44 is rotatably mounted in the clutch housing. This shaft has a body 62 which has the shape of a cylinder (Fig. 6) from which segments have been removed to form parallel lateral walls 63. Forwardly, the body 62 is formed with a head 64 of substantially greater diameter than that of the shaft. The forward portion of the head, is provided with a forwardly projecting boss 66 machined with a smooth finish to serve as a rotatable seat for the tool head 24. The head 64 is formed with an annular shoulder 67 facing rearwardly. Disposed around the cylindrical body of the shaft and with its forward portion positioned against the locating shoulder 67 is the ring 68, the outer surface of which is formed with a race for the ball bearings 69. Ring 71, disposed exteriorly of the ball bearings, is formed with the other race thereof and is confined within the annular retainer 72 which is secured to the clutch housing 22 by the screw 73. The screws 73, provided with suitable washers 80, are set in countersunk surfaces on the housing. The ring 68 is maintained against axial displacement by the retaining ring 74 mounted in the groove 75 formed in a periphery of the clutch shaft. The rear face 76 of the shaft abuts against the carrier flange 48.

Clutch shaft 44 carries rearwardly of the shoulder 67 a roller clutch of the overrunning type. The shaft (Fig. 5) is formed with a plurality of circumferentially disposed inclined slots 70 each having a side wall 78 sloping inwardly from the periphery of the shaft and merging at its end with a base wall 79 to form a recess for the roller 81. The axes of the rollers are parallel to the axis of the carrier shaft. Positioned around the carrier shaft and rotatably mounted thereon is a clutch ring 82 which confines the rollers 81 within the slots 70. The clutch ring is retained against axial movement by the ring 74 at its forward end and by the ends of shafts 38 at its rear end. Upon counterclockwise motion of the clutch shaft, the rollers wedge between the side walls 78 and the inner surface of the clutch ring thereby engaging the clutch ring in counterclockwise movement and winding a spiral spring 83 (hereinafter more fully described). When the clutch shaft reverses itself upon the change of rotation of the planetaries, the wound spring will thereupon cause the clutch ring to reverse to a clockwise direction. The clutch rollers will then drive the shaft in the opposite direction with the result that the force of the spring will be transmitted through the clutch to the carrier to reinforce the torque imparted to the carrier by the planetaries in clockwise direction.

The spiral spring 83 (Figs. 1 and 5) is mounted upon the clutch ring 82 coaxially therewith, the inner terminal of the spring being anchored into the clutch ring by a terminal lug 84, and the outer terminal of the spring being anchored by a looped terminal around a screw 85. In the present embodiment of the invention, spring steel is used in the construction of the spiral spring, the first 1¼ turns being close wound and the remaining 2¾ turns being active.

The tool head 24 is mounted within the clutch housing forwardly of the planetary carrier and of the clutch shaft. The tool head has a cylindrical body or shank 86, the forward end of which may be square or of any desired cross section to cooperate with a socket or work piece to be driven. The rear portion of the tool head (Fig. 2) is formed with diametrically opposed dove-tail projections or jaws 88 disposed to cooperate with the projecting head portions or jaws 90 of the clutch shaft whereby rotary motion may be transmitted by the clutch shaft to the tool head. The shank 86 of the tool head extends slightly to the rear of the dove-tails to form a boss 89 which is machined with a smooth finish so as to provide a surface to cooperate in reciprocal rotative motion with the boss 66 in the forward recess of the clutch shaft.

Shank 86 of the tool head is supported with a rotating fit in a steel bushing 92. A resilient sleeve 93 made of oil resisting rubber surrounds the bushing and is bonded to the outer surface thereof. A synthetic rubber-like material such as that known to the trade as "neoprene" is suitable for this purpose. The synthetic rubber sleeve 93 has a press fit with a counterbore 96 near the front end of the clutch housing 22 and the front end of the sleeve rests on a shoulder 97. A bore 100 slightly larger in diameter than the steel bushing 92 is provided to avoid in operation, metal-to-metal contact between the bushing and the housing. The rear end of the resilient sleeve terminates at an angular flange 98 supporting a similar flange 99 on the steel bushing and seated on a shoulder of the clutch housing. On a lower side of said housing is located a boss 103, which is arranged to threadably receive a handle 104 which can be used for the convenient manipulation of the mechanism.

The method of operation of the mechanism is as follows: Referring to Fig. 3 as well as Figs. 10–13 (a, b and c), the main shaft 25, which rotates in a clockwise direction, imparts counterclockwise rotation to the planetary gears 35 together with members 33 with reference to shafts 38. If the points A and B (Fig. 3) are the centers of gravity of the upper and lower weighted gears respectively, each gear is subjected to a centrifugal force in a direction extending radially from the axis of rotation to the center of gravity. The combined forces tend to pull the carrier 46 in a counterclockwise direction since the planetary gears are of similar construction and disposed diametrically opposite to each other. After the gear 35 has rotated through an arc of 90° the centrifugal forces on the two weighted gears balance each other. Thereupon the direction of the thrust or pull on the carrier will become clockwise, reaching a maximum value at 180° from the position indicated in Fig. 3. When the carrier is turning in a counterclockwise direction, it winds the spiral spring 83 since the spring is secured to the clutch ring in engagement with the carrier shaft. Upon turning and until the resisting force of the spring overcomes the centrifugal impulse together with the momentum of the carrier due to such impulse, the carrier will reverse its oscillation to a clockwise direction because of the reversal of rotation of the planetaries. The spring simultaneously unwinds, and the spring impulse cooperates to reinforce the centrifugal clockwise force of the planetaries to impart a torque to the carrier greater than the motor torque. The clutch rollers 81 remain wedged in the slots 70 to maintain the clutch in engagement upon reversal of oscillation and during the unwinding of the spring, but the rotation of the planetaries continues sufficiently thereafter to overrun the wedging position of the rollers and thereby effects a release of the clutch. Since the clutch shaft is rigidly mounted upon the carrier and the jaws of the shaft cooperate with the jaws of the tool head, the increased torque of the carrier is transmitted to the tool head to produce desired impact upon the work piece.

Thus the oscillation or circular pendulum movement of the planetary carrier will continue as long as the drive shaft rotates, the tool head being rotated further in clockwise direction than in counterclockwise direction so that gradual progress of the tool head in clockwise direction will result.

While the present motor driven tool has been described as especially designed for a wrench, it will readily serve as a threading tool for pipes and the like by affixing to the forward end of the tool head shank 86 a gear meshing with a larger gear carrying a pipe die (not shown). Such an application of the invention would display the advantage that the series of impulses characteristic of the operation of the tool would reduce the reaction on the operator below that to which he would be subjected from a continuous torque accomplishing the same work.

It is evident that the proportions of the parts may be altered and other modifications made within the scope of the invention, and that the apparatus may have the internal working parts thereof arranged in positions and relations reverse to those described so that the resulting rotation of the spindle will be clockwise instead of counterclockwise.

What is claimed is:

1. In a power transmission, a driving member, a driven member, means actuated by the driving member to impart oscillatory motion to the driven member, and spring means actuated by the driven member to be wound on oscillation of the driven member in one direction and adapted to unwind and reinforce the torque of the driven member upon the oscillation of the driven member in the other direction.

2. In a power transmission according to claim 1 a driving member which is rotatable.

3. In a power transmission according to claim 1 means actuating the driven member in oscillation which comprises a pair of planetary members, having eccentric weighted portions, rotatably mounted upon shafts which are parallel to and arranged diametrically opposite each other in reference to the axis of the driving member, said shafts being mounted upon the driven member.

4. In a power transmission, a driving member, a driven member, a clutch, means actuated by the driving member to impart oscillatory motion to the driven member, and spring means associated with the clutch and actuated thereby to be wound on oscillation of the driven member in one direction and adapted to unwind and reinforce the torque of the driven member upon the oscillation of the driven member in the other direction.

5. In a power transmission a housing, a driving member, a driven member, a reversible clutch including a clutch ring, means actuated by the driving member to impart oscillatory motion to the driven member, and spring means mounted upon the housing and upon the clutch ring adapted to be wound upon the rotation of the clutch ring in one direction and to unwind upon the rotation of the clutch ring in the other direction and thereby to increase the torque of the driven member in one of the directions of its oscillation.

6. In a tool of the class wherein force is transmitted from a rotary driver to a tool head in the form of intermittent rotary impacts, in combination, a housing, a driving member, a driven member, means associated with the driving and driven members adapted upon rotation to impart reversible force couples to the driven member thereby causing the driven member to oscillate, a clutch associated with the driving and driven members, and a spring mounted on the clutch and upon the housing adapted to be wound upon the oscillation of the driven member in one direction and to be unwound synchronously with the oscillation of the driven member in the other direction whereby to reinforce the torque of the driven member.

7. In a tool according to claim 6 oscillating means comprising twin members rotatably mounted upon shafts carried by the driven member the axes of which are parallel to the axis of the driven member and are disposed in diametric opposition to each other, each of said twin members being provided with eccentric weights whereby oscillating rotation is imparted to the driven member.

8. In a tool according to claim 6 oscillating means which rotate about the driving member in planetary rotation.

9. In a tool of the class described, in combination, a housing, a driving member, a driven member, means associated with the driving member to transmit oscillating motion to the driven member, a clutch shaft mounted upon the driven member coaxially therewith, a clutch mounted upon the clutch shaft, spring means associated with the housing and with the clutch adapted to be wound and to unwind in response to the oscillations of the driven member, and a tool head associated with the clutch shaft.

10. A combination according to claim 9 wherein the oscillation transmitting means comprises twin members rotatably mounted on shafts carried diametrically opposite each other upon the driven member and having eccentric weighted portions which are disposed symmetrically with reference to the axis of the driving member whereby upon rotation of the twin members upon their shafts force couples are created upon the driven member causing the same to oscillate.

11. In a tool of the class described, in combination, a housing, a driving member, a driven member, an element to transmit uniform rotary motion of the driving member to the driven member in oscillatory rotary form, said element comprising twin bodies rotatably mounted on shafts carried diametrically opposite each other upon the driven member and having eccentric weighted portions which are disposed symmetrically with reference to the axis of the driving member whereby upon rotation of the twin members upon their shafts force couples are created upon the driven member causing the same to oscillate, a clutch associated with the driven member, spring means associated with the housing and with the clutch adapted to be wound and to unwind in response to and synchronously with the oscillations of the driven member whereby the force of the driven member rotating in one direction is stored as energy in the spring and the force generated by the spring in unwinding reinforces the torque of the driven member.

12. A tool according to claim 11 in which the driving member is in geared relation to the element which generates oscillatory motion.

13. A tool according to claim 11 in which a clutch shaft is mounted upon the driven member and acts as a carrier for the clutch.

14. A tool according to claim 11 in which a tool head is associated with the driven member and in which a clutch shaft adapted to carry the clutch is coaxially and rigidly mounted upon the driven member and is provided with driving dogs to impart rotary motion to the tool head.

15. A rotary impact tool comprising a housing, a driving member rotatably supported within the housing and having a stationary axis, a rotatable driven member provided with a flange and an end ring, stub shafts mounted upon the driven member and disposed diametrically opposite each other and in axial parallelism to the driven member, twin planetary members in geared relation to the driving member and rotatably mounted upon the stub shafts, each of said planetary members being provided with an eccentric weight in all respects the same and being positioned in symmetry with each other in reference to the axis of the driving member, a clutch shaft rigidly mounted upon the driven member and provided with driving dogs, an overrunning clutch including a clutch ring, spring means anchored to the clutch ring and to the housing adapted to be wound by the rotation of the clutch ring in one direction and to unwind upon reversal of the clutch, the planetary members being adapted to impart oscillatory motion to the driven member and the spring being adapted to store energy upon winding and to release the same to reinforce the torque imparted to the driven member by the oscillation of the planetary members, and a tool head adapted to cooperate with the dogs of the clutch shaft and to receive oscillatory motion therefrom.

References Cited in the file of this patent

UNITED STATES PATENTS

| Number | Name | Date |
|---|---|---|
| 1,404,371 | Campbell | Jan. 24, 1922 |
| 1,972,484 | Hobbs | Sept. 4, 1934 |
| 2,161,604 | Watts | June 6, 1939 |
| 2,374,718 | Andrew | May 1, 1945 |